United States Patent
Kim et al.

(10) Patent No.: US 9,348,487 B2
(45) Date of Patent: May 24, 2016

(54) APPARATUS AND METHOD FOR GENERATING COGNITIVE AVATAR

(71) Applicant: KOREA INSTITUTE OF SCIENCE AND TECHNOLOGY, Seoul (KR)

(72) Inventors: Ig Jae Kim, Goyang-si (KR); A Rim Lee, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 182 days.

(21) Appl. No.: 14/073,975

(22) Filed: Nov. 7, 2013

(65) Prior Publication Data

US 2014/0129989 A1    May 8, 2014

(30) Foreign Application Priority Data

Nov. 7, 2012 (KR) .................. 10-2012-0125704

(51) Int. Cl.
*G06F 3/0481* (2013.01)
*G06F 3/0482* (2013.01)
*G06N 3/12* (2006.01)
*G06K 9/00* (2006.01)
*G06N 3/00* (2006.01)
(Continued)

(52) U.S. Cl.
CPC ............ *G06F 3/0482* (2013.01); *G06F 3/0481* (2013.01); *G06K 9/00308* (2013.01); *G06N 3/006* (2013.01); *G06N 3/126* (2013.01); *G06F 3/04817* (2013.01); *G06F 17/30274* (2013.01); *H04N 1/00442* (2013.01)

(58) Field of Classification Search
CPC . G06F 3/0481; G06F 3/04817; G06F 3/0482; G06F 9/4443; G06F 17/30274; H04N 5/44543; H04N 1/00442
See application file for complete search history.

(56) References Cited

U.S. PATENT DOCUMENTS

2001/0036860 A1*  11/2001  Yonezawa .............. G06T 13/40
                                                                   463/30
(Continued)

FOREIGN PATENT DOCUMENTS

KR    10-2002-0015642 A    2/2002
KR    10-2004-0083759 A    10/2004
(Continued)

OTHER PUBLICATIONS

Korean Office Action issued Apr. 25, 2014 in counterpart Korean Patent Application No. 10-2012-0125704 (56 pages, in Korean with English Translation).

*Primary Examiner* — Tadeese Hailu
*Assistant Examiner* — Shangao Zhang
(74) *Attorney, Agent, or Firm* — NSIP Law

(57) ABSTRACT

One or more embodiments of the present invention relate to an apparatus and method for generating a cognitive avatar, and according to one or more of the above embodiments of the present invention, the process of allowing the user to select images, which are recognized as similar, from face images of various impressions which are classified as a plurality of impression groups and are stored, is repeatedly performed, and an avatar, which corresponds to the target face which the user intends to generate as the avatar, by a cognitive approach based on the repeatedly performed user's selection, so that a natural avatar, which is similar to the target face, may be expressed without a separate analysis or re-analysis process for the target face.

18 Claims, 9 Drawing Sheets

(51) Int. Cl.
*H04N 1/00* (2006.01)
*G06F 17/30* (2006.01)

(56) References Cited

U.S. PATENT DOCUMENTS

| | | | | |
|---|---|---|---|---|
| 2007/0067279 | A1* | 3/2007 | Bonabeau | G06F 17/30864 |
| 2007/0298866 | A1* | 12/2007 | Gaudiano | A63F 13/00 463/23 |
| 2011/0007174 | A1* | 1/2011 | Bacivarov | G06J 9/00281 348/222.1 |
| 2012/0288166 | A1* | 11/2012 | Sun | G06K 9/00288 382/118 |

FOREIGN PATENT DOCUMENTS

| | | |
|---|---|---|
| KR | 10-2005-0011120 A | 1/2005 |
| KR | 10-2012-0006610 A | 1/2012 |

* cited by examiner

APPARATUS AND METHOD FOR GENERATING COGNITIVE AVATAR

RELATED APPLICATIONS

This application claims the benefit of Korean Patent Application No. 10-2012-0125704, filed on Nov. 7, 2012, in the Korean Intellectual Property Office, the disclosure of which is incorporated herein in its entirety by reference.

BACKGROUND

1. Field

One or more embodiments of the present invention relate to an apparatus and method for generating a cognitive avatar, and more particularly, to an apparatus and method for generating a cognitive avatar, which may generate an avatar corresponding to a face which a user targets by cognitively approaching an impression of the target face which the user desires to generate as an avatar.

2. Description of the Related Art

According to conventional avatar generation technologies, an avatar has been generated by remembering images similar to a target face for which a user tries to generate an avatar by parts of the face, and selecting and combining the images. The related art is disclosed in Korean Patent Publication No. 2005-0011120.

However, the technology of generating an avatar through a method such as selectively combining images by parts of a face uses an approach method which does not fit the cognition system of a human, and thus the conventional technology is not sufficient in expressing an impression in a person's brain in terms of a human's cognitive aspects, and an unnatural avatar or an avatar which is not similar to the target face may be generated. That is, the conventional technology has a limitation in acquiring an image of an impression of a face recognized by a user or generating the image as an avatar.

As such, there is a need for a technology of generating an avatar which cognitively expresses an image of a target face recognized by a user using a cognitive approach method in order to fit the human's cognitive system.

The present invention has been drawn from a study which is performed as part of the industry convergence fundamental technology development business [Task No.: 2MR0270, Task name: development of a 3D montage generation and by-age face conversion prediction system] of the Ministry of Knowledge Economy and Korea Evaluation Institute of Industrial Technology.

SUMMARY

One or more embodiments of the present invention include an apparatus and method for generating a cognitive avatar, which may generate an avatar having a natural avatar which is similar to a target face which is recognized by a user, using a cognitive approach in order to fit a human cognitive system.

Additional aspects will be set forth in part in the description which follows and, in part, will be apparent from the description, or may be learned by practice of the presented embodiments.

According to one or more embodiments of the present invention, an apparatus for generating a cognitive avatar includes a database in which a plurality of face images are classified as a plurality of impression groups and are stored; an impression group estimation unit which estimates an impression group, to which the user's target face belongs, based on a user's selection on candidate face images which belong to face images stored in the database; a genetic operation unit which generates a plurality of avatar candidate images by performing a genetic algorithm based operation based on at least part of face images which belong to the estimated impression group; an avatar generation unit which generates an avatar corresponding to the target face, based on the user's selection on the plurality of avatar candidate images; and a user interface which displays the candidate face images, receives the user's selection on the candidate face images and transmits the received selection to the impression groups estimation unit, displays the avatar candidate images, and receives the user's selection on the avatar candidate images and transmits the received selection to one of the genetic operation unit and the avatar generation unit.

According to one or more embodiments of the present invention, a method of generating a cognitive avatar includes displaying candidate face images which belong to face images stored in a database in which a plurality of face images are classified as a plurality of impression groups and are stored; estimating an impression group, to which the user's target face belongs, based on a user's selection, by repeatedly performing a process of receiving the user's selection among the displayed candidate face images; generating a plurality of avatar candidate images by performing a genetic algorithm based operation based on at least part of face images which belong to the estimated impression group; and generating an avatar corresponding to the target face, based on the user's selection on the displayed plurality of avatar candidate images.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
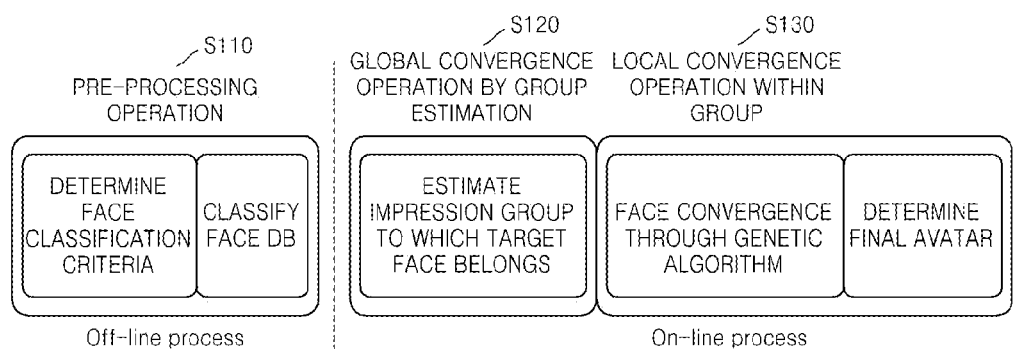
FIG. 1 is a diagram illustrating an overall flow of a method of generating an avatar which cognitively approaches a user's target face, according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Functions of various devices including function blocks displayed as a processor or a similar concept thereof illustrated in drawings may be provided by a use of hardware having a capacity to execute software with respect to appropriate software as well as dedicated hardware. When provided by a processor, the functions may be provided by a single dedicated processor, a single shared processor, or a plurality of individual processors, and part thereof may be shared.

FIG. 1 is a diagram illustrating an overall flow of a method of generating an avatar which cognitively approaches a user's target face, according to an embodiment of the present invention.

Referring to FIG. 1, the method of generating an avatar according to the present embodiment may include a preprocessing operation 110, a global convergence operation 120 by group assumption, and a local convergence operation 130 within a group.

In the preprocessing operation 110, when repeating a process of selecting a face image having an impression recognized as similar to the target face among face images displayed in the process of generating an avatar, a plurality of face images are classified into a plurality of impression groups in advance and are stored in a database in order to generate an avatar which is similar to the target face based on the user's selections.

Here, the impression group may be classified to correspond to impression features of a face image recognized by a person, such as a "cold impression", "warm impression", "tough impression", "sharp impression", and "mild impression", may be classified according to the face shape, may be classified according to main ingredients of the face image, or may be classified according to the classification criteria of the cognitive science or cognitive psychology. Hence, the present embodiment does not limit the classification criteria of the impression group.

In the global convergence operation 120, the global convergence process to the target face is performed by estimating the impression group to which the target face belongs to based on the user's selection on the displayed face images.

In the local convergence operation 130, the genetic algorithm based operation is performed on at least part of face images, which belong to the estimated impression group, so as to generate a plurality of avatar candidate images, and the local convergence process to the target face is performed based on the user's selection on such avatar candidate images. Specifically, the images locally converge to the user's target face through a process of re-generating avatar candidate images closer to the target face and being re-selected by the user based on the user's selection on the avatar candidate images generated by the genetic operation. Likewise, the avatar is generated based on the avatar candidate image which converges to the user's target face according to the user's selection.

Likewise, according to a method of generating an avatar of the present embodiment, the user makes selections to obtain face images closer to the target face without going through a separate process of analyzing or determining, by the user, the impression or shape features of the target face and thus the images may converge to the face image similar to the user's target face, and an avatar, which cognitively expresses well the image of the target face recognized by the user, may be generated by generating the avatar based on the converged face image.

Figure 2:
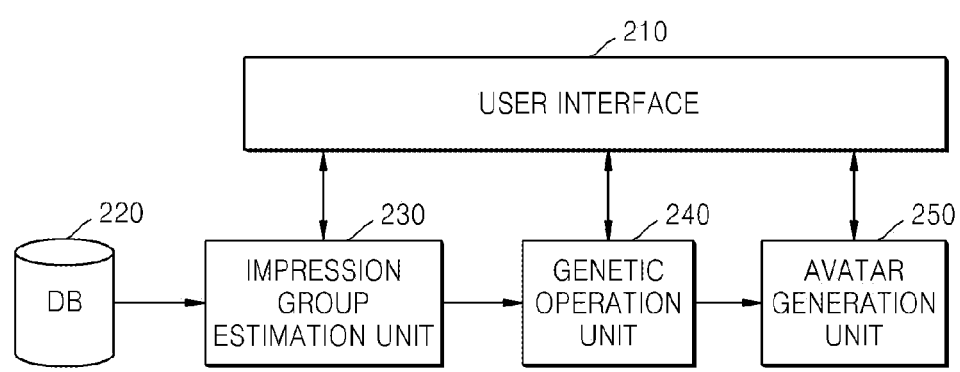
FIG. 2 is a block diagram schematically illustrating a device of generating an avatar which performs a process of generating an avatar according to an embodiment of the present invention.

FIG. 2 is a block diagram schematically illustrating a device of generating an avatar which performs a process of generating an avatar according to an embodiment of the present invention.

Referring to FIG. 2, the avatar generation apparatus according to the present embodiment includes a user interface 210, a database 220, an impression group estimation unit 230, a genetic operation unit 240, and an avatar generation unit 250. It is obvious that components other than the above-described components may be included in the avatar generation apparatus.

Each of the user interface 210, the database 220, the impression group estimation unit 230, the genetic operation unit 240, and the avatar generation unit 250, which are components of the avatar generation apparatus, may be a program module whose at least part communicates with an external terminal device or an external server. Such program modules may be an operating system, an application program module, and another program module and may be included in the avatar generation apparatus, and may be physically stored in various kinds of known memory devices. Furthermore, such program modules may be stored in a remote memory device which may communicate with the avatar generation apparatus. Furthermore, such program modules cover a routine, a sub-routine, a program, an object, a component, and a data structure for performing a particular task or a particular abstraction data type, but the embodiments of the present invention are not limited thereto.

The user interface 210 is connected to other components, that is, the impression group estimation unit 230, the genetic operation unit 240, and the avatar generation unit 250, for the cognitive approach, and displays face images to the user and allows the user to select at least one of the displayed face images. As such, the user interface 210 provides a function of converging the user's target face based on the user's selection in other components by transmitting the user's selection to the other components, that is, the impression group estimation unit 230, the genetic operation unit 240, and the avatar generation unit 250.

The database 220 stores a plurality of face images which have been classified as a plurality of impression groups. As described above, the classification criteria may be features of impression, face shapes, and main ingredients of the face image, but they are only for the explanatory convenience and do not limit the scope of the embodiments of the present invention.

The impression group estimation unit 230 displays candidate face images among face images stored in the database 220, receives the user's selection on candidate face images through the user interface 210, and estimates the impression group to which the user's target face belongs based on the received user's input.

At this time, after the impression group estimation unit 230 completes the estimation of the impression group, the user interface 210 additionally displays face images which belong to the estimation-completed impression group, receives the user's selection among the displayed face images, and transmits the selected face images to the genetic operation unit 240.

The genetic operation unit 240 generates a plurality of avatar candidate images by performing an operation based on a genetic algorithm based on at least part of face images which belong to the impression group which is estimated in the impression group estimation unit 230. For example, when face images, which have been selected by the user among the face images which belong to the estimation-completed impression group, are transmitted from the user interface 210, the operation based on the genetic algorithm may be performed based on the face images.

Some examples of the operations based on the genetic algorithm performed in the present embodiment are a crossover operation and a mutation operation, and the crossover operation may newly generate face images which may be drawn from the selected face images by crossing the subject face images. Furthermore, the mutation operation may reduce errors by providing a possibility of adding the impression which is not contained in the selected face by mutating the genetic information of the face image in order to solve the problem of the rapid convergence to the side away from the user's target face by allowing the user to select the face images within the limited range (displayed face images) and crossing the selected face images. Hence, both the crossover operation and the mutation operation may be performed when generating a plurality of avatar candidate images by performing an operation based on the genetic algorithm in the genetic operation unit according to the present embodiment.

The avatar generation unit 250 receives the user's selection on the plurality of avatar candidate images generated in the genetic operation unit 240 through the user interface 210, and generates an avatar corresponding to the target face based on the received user's selection.

The user's selection on avatar candidate images may be divided into a final selection of selecting one avatar candidate image which fits the target face among a plurality of avatar candidate images, and a similarity selection of selecting at least one avatar candidate image similar to the target face among a plurality of avatar candidate images. Furthermore, when the user's selection on the plurality of avatar candidate images is the final selection, the user interface 210 transmits one avatar candidate image, which has been selected as the final selection, to the avatar generation unit, and when the user's selection is the similarity selection, the user interface 210 transmits at least one avatar candidate image, which has been selected as the similarity selection, to the genetic operation unit 240.

As such, when the user's selection on the plurality of avatar candidate images is the final selection, the avatar generation unit 250 may need to generate an avatar based on one avatar candidate image which has been selected as the final selection which has been transmitted from the user interface 210.

However, when the user's selection on the plurality of avatar candidate images is the similarity selection, the operation based on the genetic algorithm is performed based on at least one avatar candidate image selected by the selected avatar similarity selection through the genetic operation unit 240 to re-generate a plurality of avatar candidate images, and the process of convergence to the user's target face is additionally performed by receiving the user's selection on the displayed avatar candidate images.

The user interface 210 may recognize whether the user desires an additional selection even when the user's selection on the plurality of avatar candidate images is the similarity selection, and, at this time, when the user does not desire the additional selection, at least one or more avatar candidate images, which have been selected as the similarity selection, may be transmitted to the avatar generation unit 250. Furthermore, the avatar generation unit may generate an avatar corresponding to the target face based on the average image of at least one avatar candidate image selected by the similarity selection.

Figure 3:
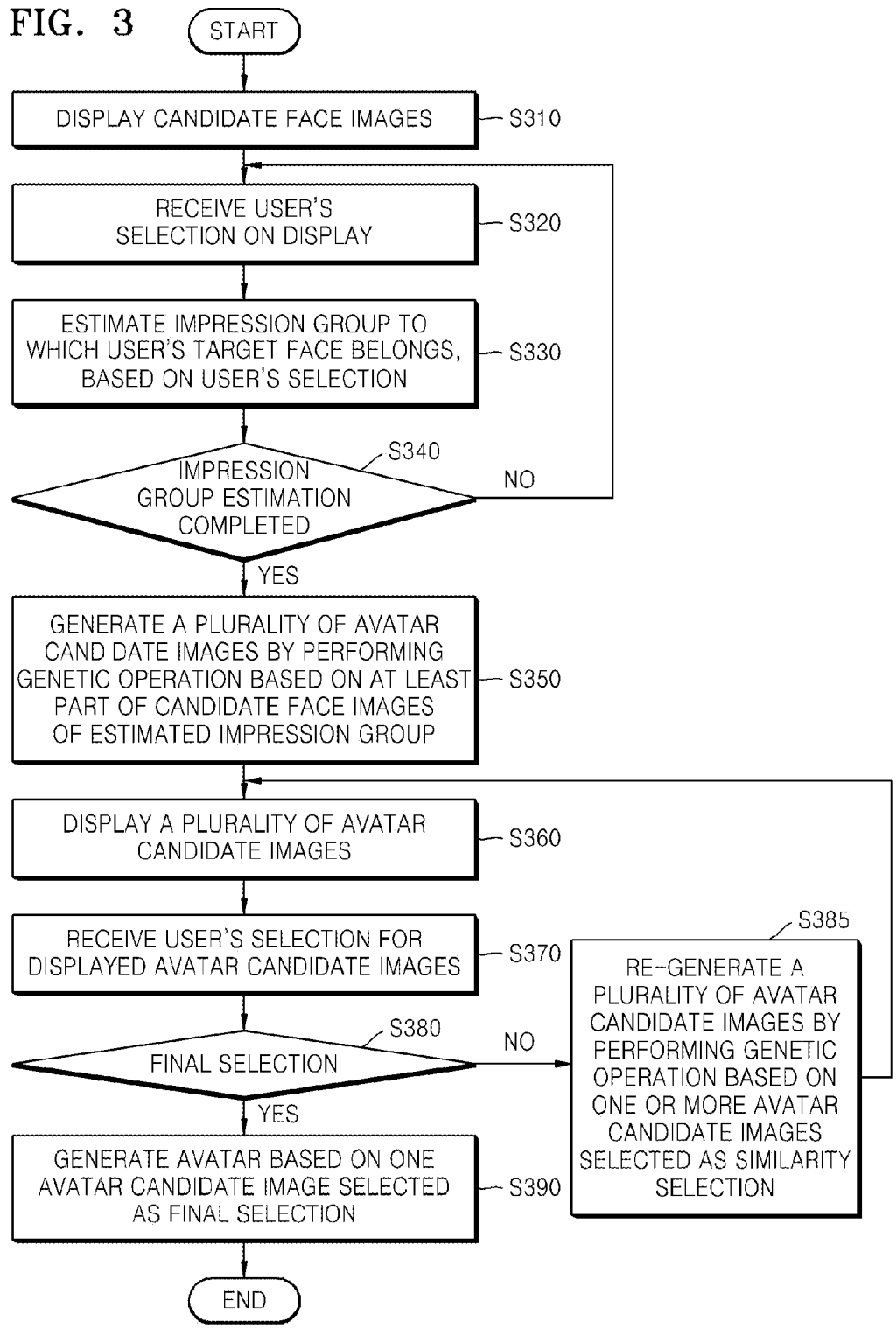
FIG. 3 is a flowchart specifically illustrating a method of generating an avatar according to an embodiment of the present invention.

FIG. 3 is a flowchart specifically illustrating a method of generating an avatar according to an embodiment of the present invention, and the avatar generation method according to the present embodiment may be performed in the avatar generation apparatus illustrated in FIG. 2. Hence, the points, which have already been described with reference to the avatar generation apparatus of FIG. 2, are omitted.

Referring to FIG. 2, a plurality of face images are classified into a plurality of impression groups, and face images, which are stored from the established database, are loaded so as to display candidate face images (S310). The candidate face images may be randomly selected among the loaded face images or may be evenly selected by impression groups, but this is merely for explanatory convenience, and does not limit the algorithm of selecting a candidate face image in the present embodiment.

The user's selection is received among candidate face images displayed in operation S310 (S320).

The impression group, to which the user's target face belongs, is estimated based on the user's selection received in operation S320 (S330).

It is determined whether the impression group estimation has been completed as a result of the impression group estimation in operation S330 (S340).

When the impression group estimation is completed as a result of determination in operation S340, a plurality of avatar candidate images are generated by performing the genetic algorithm based operation based on at least part of the candidate face images of the estimated impression group (S350).

A plurality of candidate images generated in operation S350 are displayed (S360).

The user's selection on the avatar candidate images displayed in operation S360 is received (S370).

When the user's selection received in operation S370 is the final selection of selecting one avatar candidate image which fits the user's target face (S380), an avatar corresponding to the target face is generated based on one avatar image which is selected as the final selection (S390).

When the user's selection received in operation S370 is not the final selection, but the similarity selection of selecting at least one avatar candidate image similar to the target face, the genetic algorithm based operation is performed based on at least one avatar candidate image, which has been selected as the similarity selection, so as to re-generate a plurality of avatar candidate images (S385).

The avatar candidate images to be generated as an avatar converge to the user's target face as much as possible according to the user's selection by repeatedly performing operations S360 to S380 based on re-generated avatar candidate images in operation S385 until the user's selection received in operation S370 becomes the final selection.

Furthermore, when it is recognized that the user does not desire an additional selection even if the user's selection on the plurality of avatar candidate images is the similarity selection, the plurality of avatar candidates are not re-generated in operation S385, and an avatar corresponding to the target face may be generated based on the average image of one or more avatar candidate images which have been selected as the similarity selection (not shown).

Figure 4:
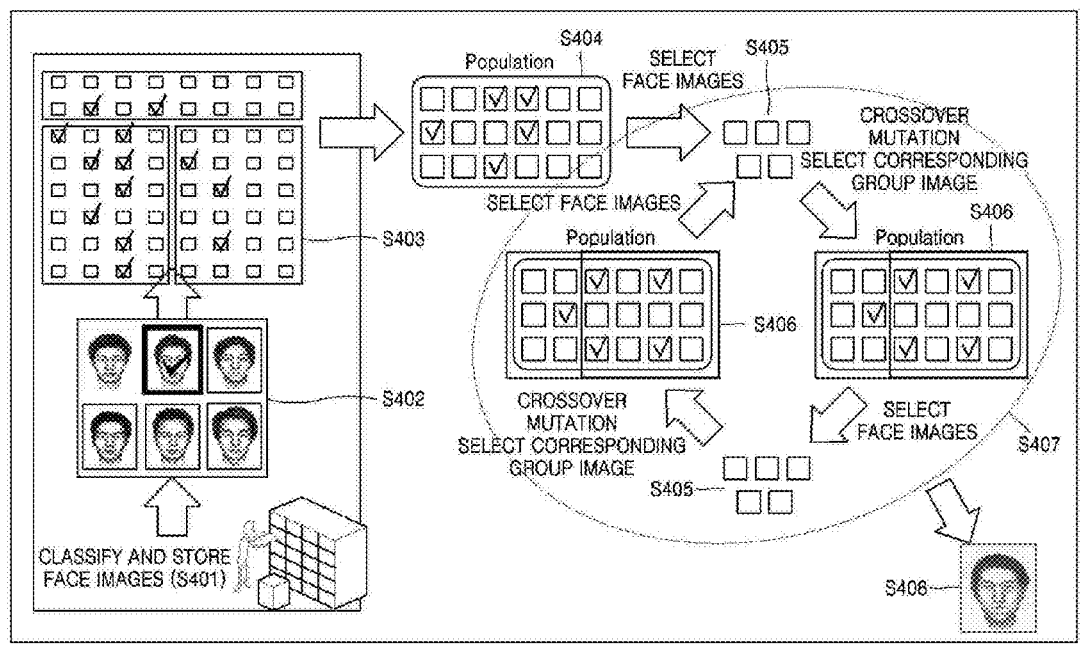
FIG. 4 is a diagram illustrating a process of finding a face image which converges to the user's target face through a cognitive approach according to an embodiment of the present invention.

FIG. 4 is a diagram illustrating a process of finding a face image which converges to the user's target face through a cognitive approach according to an embodiment of the present invention.

Referring to FIG. 4, face images are classified by applying classification criteria, which have been proved effective using study results of cognitive science or cognitive psychology, etc., and the classified face images are stored as a database (S401).

The process of loading face images stored in the database, displaying at least part of the loaded face images, and receiving the user's selection among the displayed face images is repeated (S402).

The impression group, to which the face image corresponding to the user's target face belongs, is estimated (global convergence) based on the user's selection received in operation S402 (S403).

Face images of the estimated impression group are loaded, and at least part of the loaded face images is generated as a group of avatar candidate images to be displayed to the user (S404). The face images are displayed so as to receive the user's selection among the displayed face images (S405), and the next-generation group of avatar candidate images is generated after further converging to the user's target face by performing the genetic algorithm based operation on the face images selected by the user (S406). At this time, the convergence of the face images drawn from the genetic operation to the face image of an impression, which is different from the target face, may be prevented by selectively including other face images of the impression group estimated in operation S403 as well as the face image drawn as a result of the genetic operation, in the next-generation avatar candidate image group.

The face image, which converges to the target face, may be drawn (S408) by repeatedly performing the operations S405 to S406 (local convergence) (S407) until the user-desired target face is drawn.

FIGS. 5A to 5F are diagrams specifically illustrating individual operations of a process of selecting a face image which fits the user's target face according to an embodiment of the present invention, and it is assumed that face images of a database are classified into three impression groups of A, B, and C and each impression group includes 9 face images. As such, it is assumed that a total of 27 face images are stored in the database.

Figure 5A:
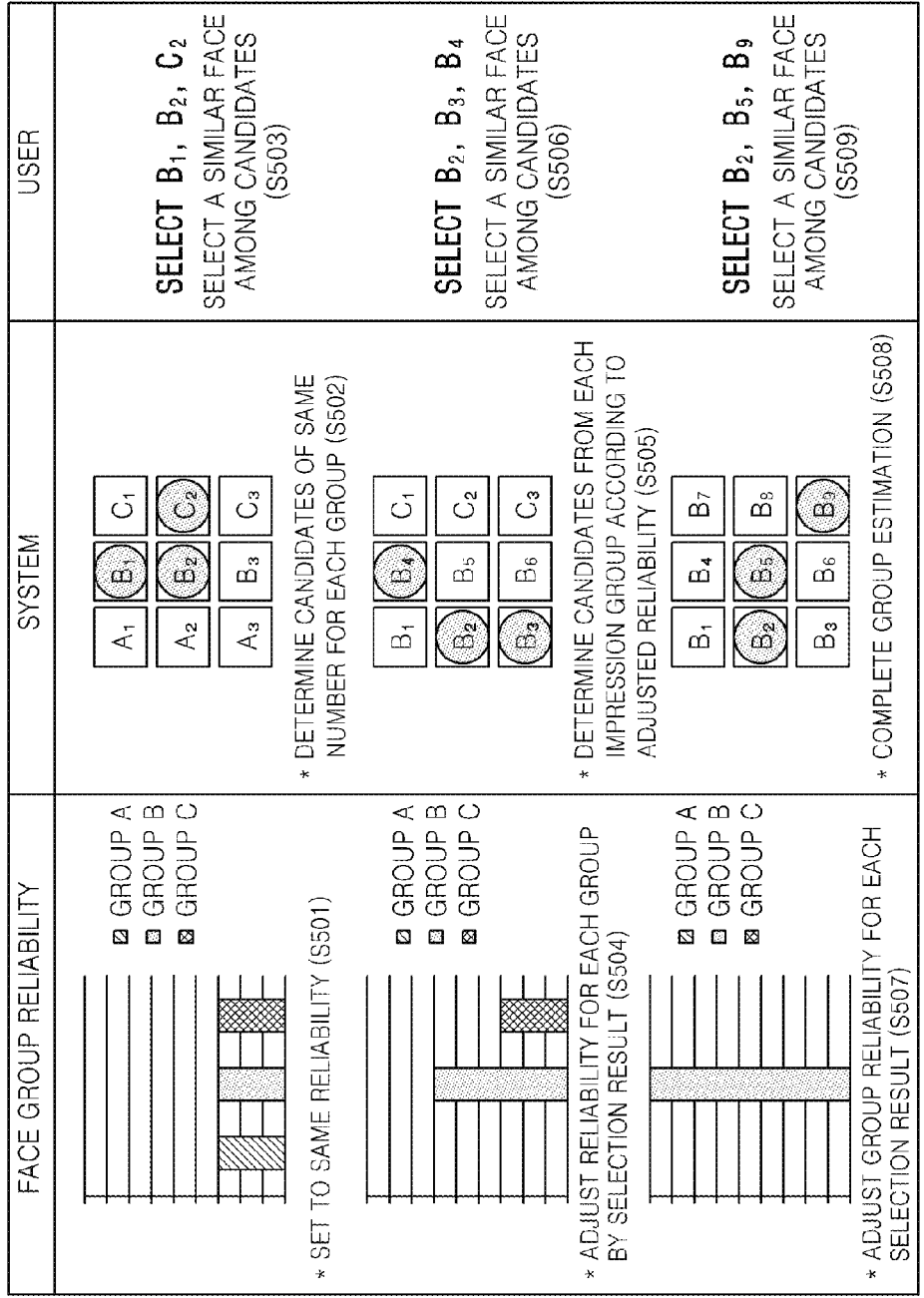
FIGS. 5A to 5F are diagrams specifically illustrating individual operations of a process of selecting a face image which fits the user's target face according to an embodiment of the present invention.

FIG. 5A is a diagram illustrating a global convergence process of estimating an impression group under such an assumption, and it is assumed that, if 9 candidate face images are selected among the face images stored in the database and are displayed through one screen, the user recognizes the 9 candidate face images on the same screen and selects a face image which appears to be similar to the target face among the candidate face images.

In the present embodiment, in order to select one impression group which fits the user's selection most among a plurality of impression groups from the user's selection, the estimation process of the impression group is performed by setting the reliability level for each impression group, reflecting the user's selection, and adjusting such a reliability level.

Referring to FIG. 5A, the same reliability is set for each impression group (S501).

The number of candidate face images to be selected for each impression group is determined in proportion to the reliability for each impression group, and at the current operation, the same reliability has been set for each impression group in the previous operation S501, and thus the candidate face images of the same number (3) for each impression group are selected and displayed (S502).

The user selects B1, B2, and C2 which are three face images which are recognized similarly to the target face among the 9 displayed candidate face images (S503).

The reliability for each impression group is adjusted according to the selection result in operation S503 (S504). In the present embodiment, B1, B2, and C2 have been selected, and thus the reliability for each group may be adjusted to the level of A:B:C=0%:66%:33%.

The number of candidate face images to be selected for each impression group is determined in proportion to the reliability adjusted in operation S504, and the candidate face images are selected for each impression group (S505). 6 among 9 candidate face images is selected from face images of group B having the reliability of 66%, and 3 is selected from face images of group C having the reliability of 33%.

If B2, B3, and B4, which are face images that are recognized similarly to the target face, are selected among the 9 displayed candidate face images (S506), the reliability for each impression group is readjusted according to such a selection result (S507). When the selection result according to the present embodiment is reflected, the reliability for each group may be adjusted to the level of A:B:C=0%:99%:0%, and in this case, group B may be estimated as an impression group corresponding to the user's target face and the estimation is completed (S508).

Additionally, in order to make the local convergence process within the impression group easy, at least part of the face images of the impression group is displayed on one screen as the candidate face images, and face images, which are relatively similar to the target face, may be selected by the user among the face images of the impression group (S509).

That is, according to the present embodiment, the impression group corresponding to the user's target face may be estimated by repeatedly performing the process of selecting a candidate face according to the reliability for each group, selecting a similar face by the user, and adjusting the reliability of the impression group until the estimation may be completed as one impression group.

Figure 5B:
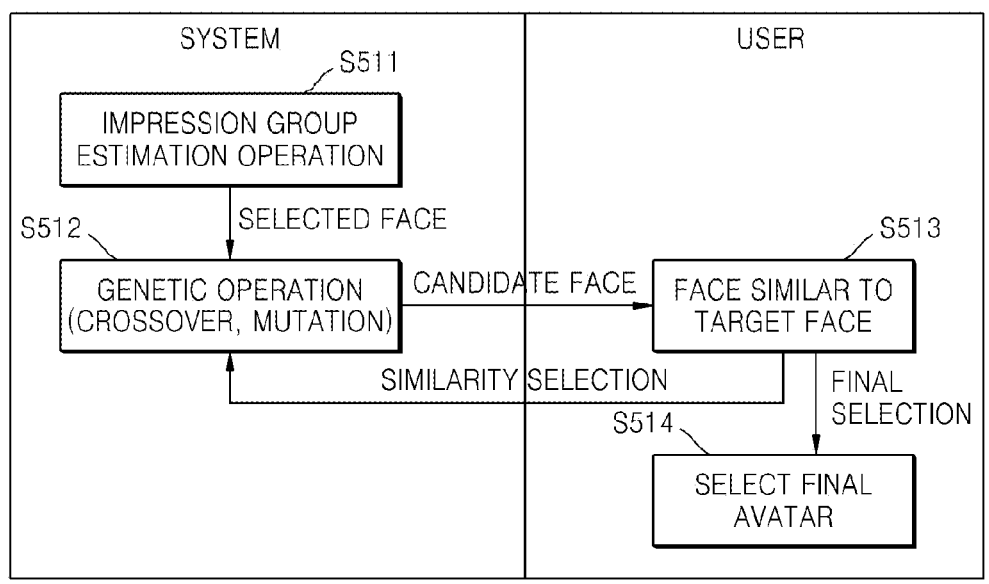
Figure 5C:
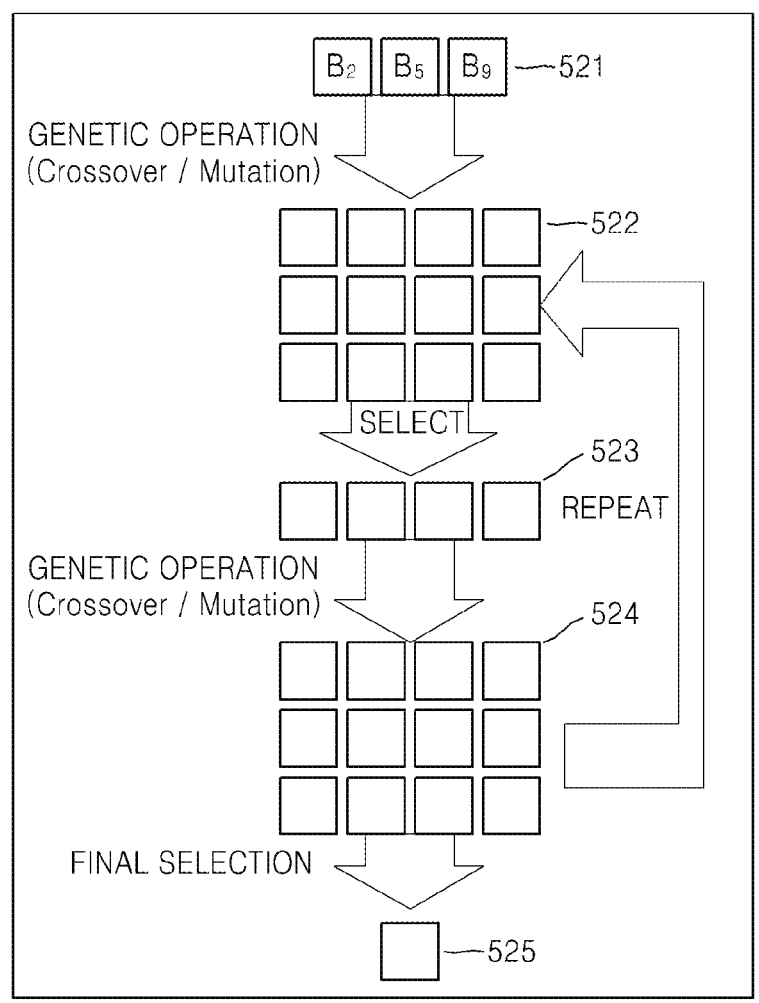

FIGS. 5B and 5C are diagrams illustrating a local convergence process of drawing a face image corresponding to the user's target face based on the impression group estimated according to the embodiment illustrated in FIG. 5A.

Referring to FIG. 5B, some of the face images, which belong to the impression group estimated (S511) according to the embodiment illustrated in FIG. 5A, are selected, the operation based on the genetic algorithm such as crossing-over and mutation is performed (S512) for the selected face images to generate avatar candidate images so as to display the generated avatar candidate images to the user. The user selects one or more face images (similarity selection) similar to the target face among the displayed avatar candidate images, the operation based on the genetic algorithm such as crossing-over and mutation is operated again for the selected face images, and the similarity selection is performed by the user (S512 to S513), which is repeated. Furthermore, if one face image corresponding to the target image is selected (final selection) from the user in operation S513, an avatar is generated based on the finally selected face image.

Referring to FIG. 5C, a plurality of avatar candidate images 522 are generated by crossing over or mutating B2, B5, and B9 (521) which have been selected by the user as similar face images within the group estimated in operation S509 of the embodiment illustrated in FIG. 5A.

The user selects one or more face images 523, which are similar to the target face, among the plurality of generated avatar candidate images, the selected face images are crossed over or mutated again so as to generate a plurality of avatar candidate images 524, which is repeated until one face image 525 is finally selected by the user.

The avatar having an impression very close to the target face may be generated by generating an avatar based on the face image 525 which has been finally selected from the user.

Figure 5D:
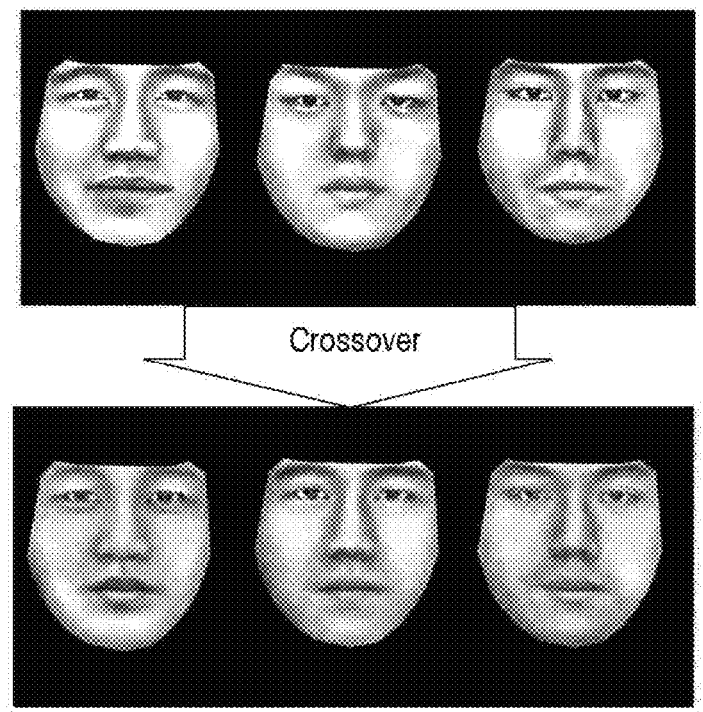
Figure 5E:
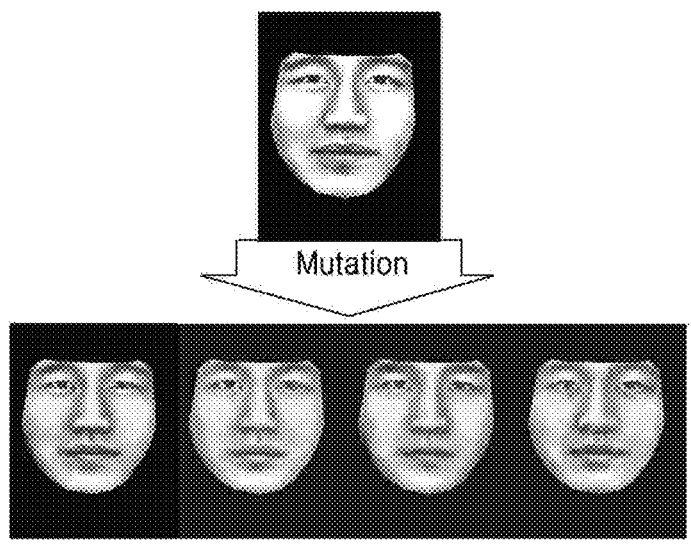

FIGS. 5D and 5E are diagrams illustrating crossover and mutation operations among operations based on the genetic algorithm used in the embodiment illustrated in FIGS. 5B and 5C, and the genetic operations according to the present embodiment may perform genetic operations using the weight values for the main elements of each face image as genetic information of each face image.

Referring to FIG. 5D, the crossover operation between face images according to the present embodiment generates face images whose characteristics are mixed by crossing over face images which are recognized by the user as similar.

Referring to FIG. 5E, the mutation operation between face images according to the present embodiment generates faces images by mutating face images which are recognized by the user as similar. The user needs to make a choice among the limited avatar candidate images, and as the face images selected by the user are arbitrarily crossed over, in order to prevent a quick convergence to an undesired face, the possibility of adding the impression or features of the face is given to the avatar candidate image.

Figure 5F:
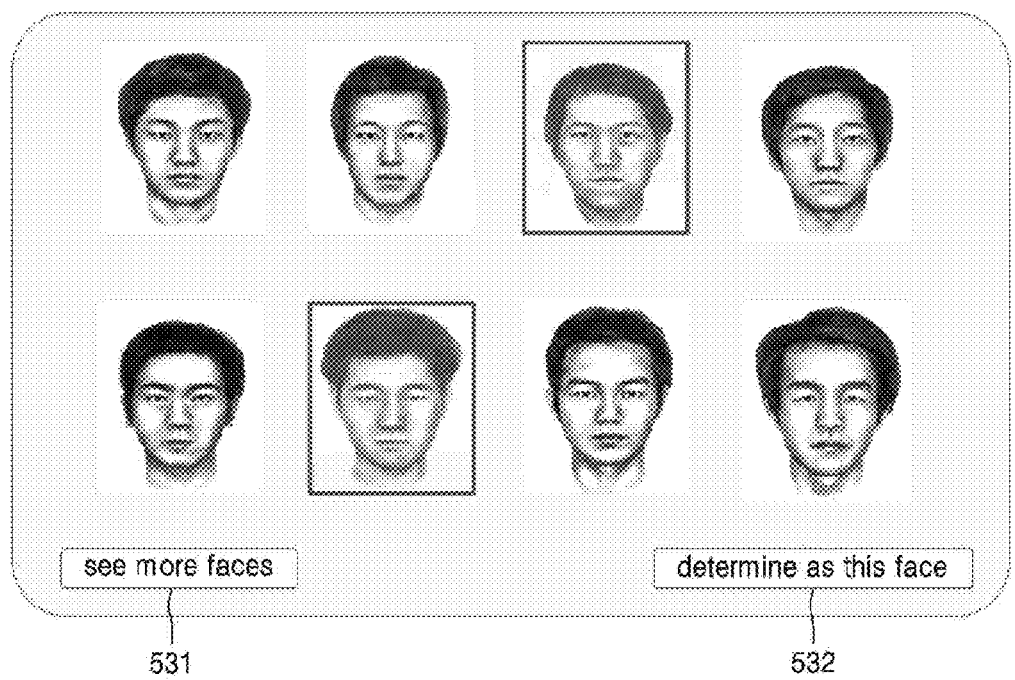

FIG. 5F is a diagram illustrating a user interface which displays avatar candidate images and receives a similar selection or final selection from the user in the embodiment illustrated in FIGS. 5B and 5C.

Referring to FIG. 5F, if the user selects one or more face images and clicks on the "see more faces" button 531, at least one face image selected by the user does not coincide the user's target face and is recognized to be within a similar range, and the crossover or mutation operation is performed for the face images selected by the user so that the same user interface is displayed in a state where the face images are changed.

If the user selects one face image and clicks on the button, it is recognized that the face image selected by the user exactly fits the user's target face, and thus the avatar corresponding to the user's target face is generated based on the selected face image.

Furthermore, if the user selects two or more face images and clicks on the "Determine as this face" button 532, it is recognized that two or more face images selected by the user do not exactly fit the user's target face and they are in a similar range, but it may be recognized that the user does not desire an additional selection, and thus an avatar corresponding to the user's target face may be generated based on the average image of two or more face images selected by the user.

As described above, according to one or more of the above embodiments of the present invention, the process of allowing the user to select images, which are recognized as similar, from face images of various impressions which are classified as a plurality of impression groups and are stored, is repeatedly performed, and an avatar, which corresponds to the target face which the user intends to generate as the avatar, by a cognitive approach based on the repeatedly performed user's selection, so that a natural avatar, which is similar to the target face, may be expressed without a separate analysis or re-analysis process for the target face.

In addition, other embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An apparatus for generating a cognitive avatar, the apparatus comprising a processor that comprises:
   a database in which a plurality of face images are classified as a plurality of impression groups and are stored;
   an impression group estimation unit which estimates an impression group, to which the user's target face belongs, based on a user's selection among candidate face images which belong to face images stored in the database;
   a genetic operation unit which generates a plurality of avatar candidate images by performing a genetic algorithm based operation based on at least part of face images which belong to the estimated impression group;
   an avatar generation unit which generates an avatar corresponding to the target face, based on the user's selection on the plurality of avatar candidate images; and
   a user interface which displays the candidate face images, receives the user's selection among the candidate face images and transmits the received selection to the impression groups estimation unit, displays the avatar candidate images, and receives the user's selection on the avatar candidate images and transmits the received selection to one of the genetic operation unit and the avatar generation unit,
   wherein the number of candidate face images from each impression group is in proportion to a reliability of each impression group, the reliability of each impression group being based on a previous selection among previous candidate face images by the user.

2. The apparatus of claim 1, wherein the user interface displays face images which belong to the estimated impression group, and receives a user's selection among the displayed face images and transmits the received selection to the genetic operation unit,
   wherein the genetic operation unit performs the genetic algorithm based operation, based on face images which have been selected among the face images which belong to the estimated impression group.

3. The apparatus of claim 1, wherein the user's selection on the plurality of avatar candidate images comprises:
   a final selection of one candidate image which fits the target image among the plurality of avatar candidate images; and
   a similarity selection of one or more avatar candidate images which are similar to the target image among the plurality of avatar candidate images.

4. The apparatus of claim 3, wherein, if the user's selection on the plurality of avatar candidate images is the final selection, the user interface transmits the one avatar candidate image, which has been selected as the final selection, to the avatar generation unit,
 wherein the avatar generation unit generates the avatar based on the one avatar candidate image which has been selected as the final selection.

5. The apparatus of claim 3, wherein, if the user's selection on the plurality of avatar candidate images is the similarity selection, the user interface transmits the one or more avatar candidate images, which have been selected as the similarity selection, to the genetic operation unit,
 wherein the genetic operation unit re-generates a plurality of avatar candidates by performing the genetic algorithm based operation, based on the one or more avatar candidate images which have been selected as the similarity selection.

6. The apparatus of claim 3, wherein the user interface transmits the one or more avatar candidate images, which have been selected as the similarity selection, to the avatar generation unit, when the user's selection on the plurality of avatar candidate images is the similarity selection, and the user does not desire an additional selection,
 wherein the avatar generation unit generates an avatar corresponding to the target face, based on an average image of one or more avatar candidate images which have been selected as the similarity selection.

7. The apparatus of claim 1, wherein the genetic algorithm based operation comprises a crossover and a mutation.

8. The apparatus of claim 1, wherein the plurality of avatar candidate images comprise face images which are drawn as a result of performing an operation based on the genetic algorithm, and face images which are different from at least part which belongs to the estimated impression group.

9. The apparatus of claim 1, wherein the reliability of each impression group is based on the number of candidate face images selected from each impression group in a previous selection by the user.

10. A method of generating a cognitive avatar, the method comprising:
 displaying candidate face images which belong to face images stored in a database in which a plurality of face images are classified as a plurality of impression groups and are stored;
 estimating an impression group, to which the user's target face belongs, based on a user's selection, by repeatedly performing a process of receiving the user's selection among the displayed candidate face images;
 generating a plurality of avatar candidate images by performing a genetic algorithm based operation based on at least part of face images which belong to the estimated impression group; and
 generating an avatar corresponding to the target face, based on the user's selection on the displayed plurality of avatar candidate images,
 wherein the number of candidate face images from each impression croup is in proportion to a reliability of each impression croup, the reliability of each impression croup being based on a previous selection among previous candidate face images by the user.

11. The method of claim 10, wherein the estimating of the impression group comprises:
 displaying face images which belong to the estimated impression group; and
 receiving the user's selection among the displayed face images,
 wherein the performing of the genetic operation comprises performing the genetic algorithm based operation based on face images which have been selected by the user among the face images which belong to the estimated impression group.

12. The method of claim 10, wherein the user's selection on the plurality of avatar candidate images comprises:
 a final selection of one candidate image which fits the target image among the plurality of avatar candidate images; and
 a similarity selection of selecting one or more avatar candidate images which are similar to the target image among the plurality of avatar candidate images.

13. The method of claim 12, wherein, if the user's selection on the plurality of avatar candidate images is the final selection, the generating of the avatar generates the avatar based on the one avatar candidate image which has been selected as the final selection.

14. The method of claim 12, wherein, if the user's selection on the plurality of avatar candidate images is the similarity selection, the generating of the avatar comprises:
 re-generating a plurality of avatar candidates by performing the genetic algorithm based operation, based on the one or more avatar candidate images which have been selected as the similarity selection; and
 receiving a user's selection on the re-generated avatar candidate images.

15. The method of claim 12, wherein the generating of the avatar comprises:
 generating an avatar corresponding to the target face, based on an average image of one or more avatar candidate images which have been selected as the similarity selection, when the user's selection on the plurality of avatar candidate images is the similarity selection, and the user does not desire an additional selection.

16. The method of claim 10, wherein the genetic algorithm based operation comprises a crossover and a mutation.

17. The method of claim 10, wherein the plurality of avatar candidate images comprise face images which are drawn as a result of performing an operation based on the genetic algorithm, and face images which are different from at least part which belongs to the estimated impression group.

18. The method of claim 10, wherein the reliability of each impression group is based on the number of candidate face images selected from each impression group in a previous selection by the user.

* * * * *